(12) United States Patent
Burukhin (10) Patent No.: US 8,086,439 B2
(45) Date of Patent: Dec. 27, 2011

(54) TRANSLATION OF TEXT INTO NUMBERS (75) Inventor: Anatoliy Burukhin, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 800 days.

(21) Appl. No.: 11/702,844

(22) Filed: Feb. 6, 2007

(65) Prior Publication Data

US 2008/0189097 A1    Aug. 7, 2008

(51) Int. Cl.
*G06F 17/28* (2006.01)
*G06F 17/27* (2006.01)

(52) U.S. Cl. ................................ 704/2; 704/4; 704/9

(58) Field of Classification Search .............. 704/1–8, 704/245, 257, 258, 270
See application file for complete search history.

(56) References Cited

U.S. PATENT DOCUMENTS

| | | | | |
|---|---|---|---|---|
| 4,811,400 A * | 3/1989 | Fisher | ............................ | 704/260 |
| 5,657,259 A | 8/1997 | Davis et al. | | |
| 5,878,393 A * | 3/1999 | Hata et al. | ...................... | 704/260 |
| 6,282,659 B1 | 8/2001 | Brennan | | |
| 6,493,662 B1 * | 12/2002 | Gillam | ............................... | 704/9 |
| 6,907,435 B2 | 6/2005 | Coulson et al. | | |
| 7,092,739 B2 | 8/2006 | Mikan et al. | | |
| 2002/0165707 A1 | 11/2002 | Call | | |
| 2003/0190020 A1 | 10/2003 | Kitchings | | |
| 2005/0071756 A1 | 3/2005 | Cipresso et al. | | |
| 2005/0240408 A1 | 10/2005 | Redin et al. | | |
| 2006/0155796 A1 * | 7/2006 | Granger | ......................... | 708/490 |
| 2006/0177017 A1 | 8/2006 | Abeta | | |

OTHER PUBLICATIONS

Gates, Barbara L. "A Numerical Code Generation Facility for Reduce", http://delivery.acm.org/10.1145/40000/32459/p94-gates.pdf? key1=32459&key2=6311797611&coll=GUIDE&dl=GUIDE&CFID=8352645&CFTOKEN=17400482.
Rahim, et al., "Robust numeric recognition in spoken language dialogue", Date: 2001, http://dit.unitn.it/~riccardi/papers/numericlang-speechcomm-2001.pdf.

* cited by examiner

*Primary Examiner* — Richemond Dorvil
*Assistant Examiner* — Olujimi Adesanya
(74) *Attorney, Agent, or Firm* — Russell S. Krajec; Krajec Patent Offices, LLC (57) ABSTRACT

A text string representing a number in a specific language is converted to a text string by tokenizing the string, distributing the tokens across a multi-level data structure to find possible distributions, and analyzing the combinations to find a valid distribution. The valid distribution may be interpreted to yield a numerical value based on the data structure. The data structure may be readily developed for any language.

21 Claims, 5 Drawing Sheets

TRANSLATION OF TEXT INTO NUMBERS

BACKGROUND

Number notations are textual or string representation of numbers. For example, the number 1005 may be represented in English text as "One thousand five". Other languages have different text representations for numerical values.

There are cases where a text string may be converted to a numerical value. However, each language has different systems for representing numbers, and each of those systems may be quite complex. Some words in number notations may be used in different ways to represent different things. A string of "two" in English may be a modifier for "thousand", "hundred", or used to represent two single units. While it may be possible to generate a set of specific rules to translate a number notation to a number in a specific language, such rules would have to be generated for every language for which a translation is desired.

SUMMARY

A text string representing a number in a specific language is converted to a text string by tokenizing the string, distributing the tokens across a multi-level data structure to find possible distributions, and analyzing the various combinations to find a valid distribution. The valid distribution may be interpreted to yield a numerical value based on the data structure. The data structure may be readily developed for any language.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Textual representation of numbers in any language may be translated to numerical values by analyzing a text string with a database defining the counting patterns of the language. A standardized yet flexible database architecture may be used to capture the subtleties of various languages, and a method may be used for determining a numerical value from a text string based on the databases.

Each language has a system for representing numbers in spoken or written form, and those systems generally have a repeating pattern, although the repeating pattern may be quite complex in some languages. A database may be created for each language using a multiple level and sublevel architecture that can adapt to any language. The database may be used for translating text strings into numbers as well as translating numbers into text strings.

The process for translating text strings into numbers involves tokenizing the string, distribute the tokens in the database to determine the possible combinations within the database, and analyzing each combination to find an intersection that determines the actual number.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
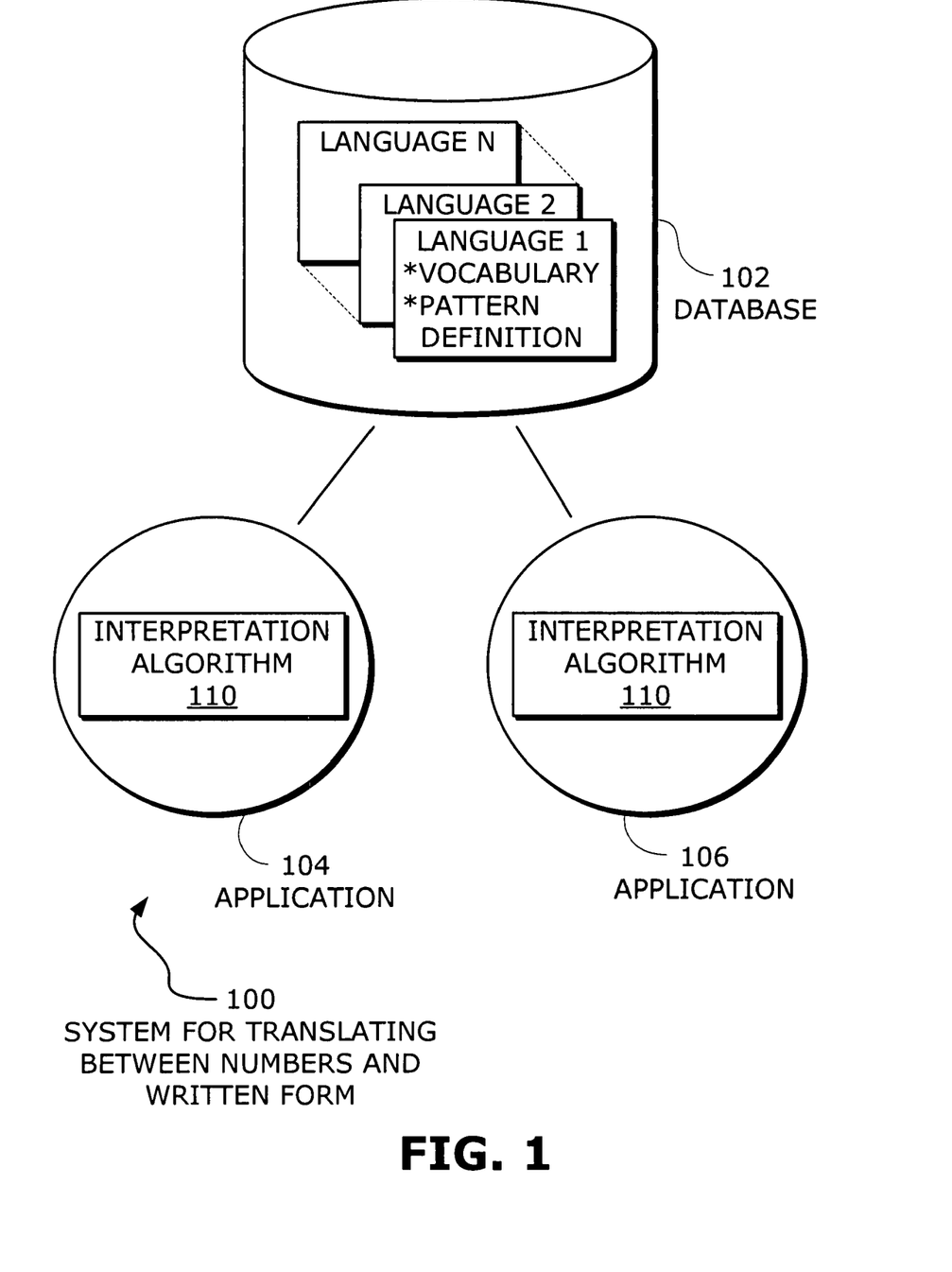
FIG. 1 is a diagram of an embodiment showing a system for translating between numbers and written form.

FIG. 1 is a diagram of an embodiment 100 showing a system for expressing numbers in written form. A database 102 is accessed by computer applications 104 and 106. Within the database 102, are the language definitions 108 for several languages. Each application 104 and 106 comprises an interpretation algorithm 110 that can query the database 102 to translate numbers to text and text to numbers.

The embodiment 100 illustrates a system by which the written or spoken expressions of numbers are captured in a database 102 for one or many languages. The languages are captured in a set of vocabulary and pattern definitions. Since the written or spoken representations of a number generally have a limited vocabulary which is used in patterns, those patterns are stored with the vocabulary in the database. The interpretation algorithm 10 can interpret the patterns for a particular text string and generate the numerical representation of the string.

The vocabulary used in the database 102 may be a written, textual vocabulary. In the written form, the vocabulary may comprise a series of text strings that are built into a longer sequence of strings to define the number. Audio representation of numbers may also be translated into numbers by first translating an audio sequence into a text string.

The language representations 108 may comprise many different languages. As support for a new language may be required, the peculiarities of the new language may be captured into the pattern definitions, and the database 102 may be updated for the new language support. Because the unique qualities of the individual languages can be captured in the database 102, the application 104 or 106 may not require modification to support a new language. Such a system may benefit application developers whose applications are used in many different cultures and countries.

The system of embodiment 100 allows different and diverse applications 104 and 106 to access a common database 102. By sharing the database 102 between different applications, the language support for many different applications may be managed through a single point, and the various applications may have a unified functionality. Additionally, new applications may use the database 102 without having to re-create the same functionality. In some situations, the use of the database 102 and the interpretation algorithm 110 may lead to a unified look and feel to the various applications.

Figure 2:
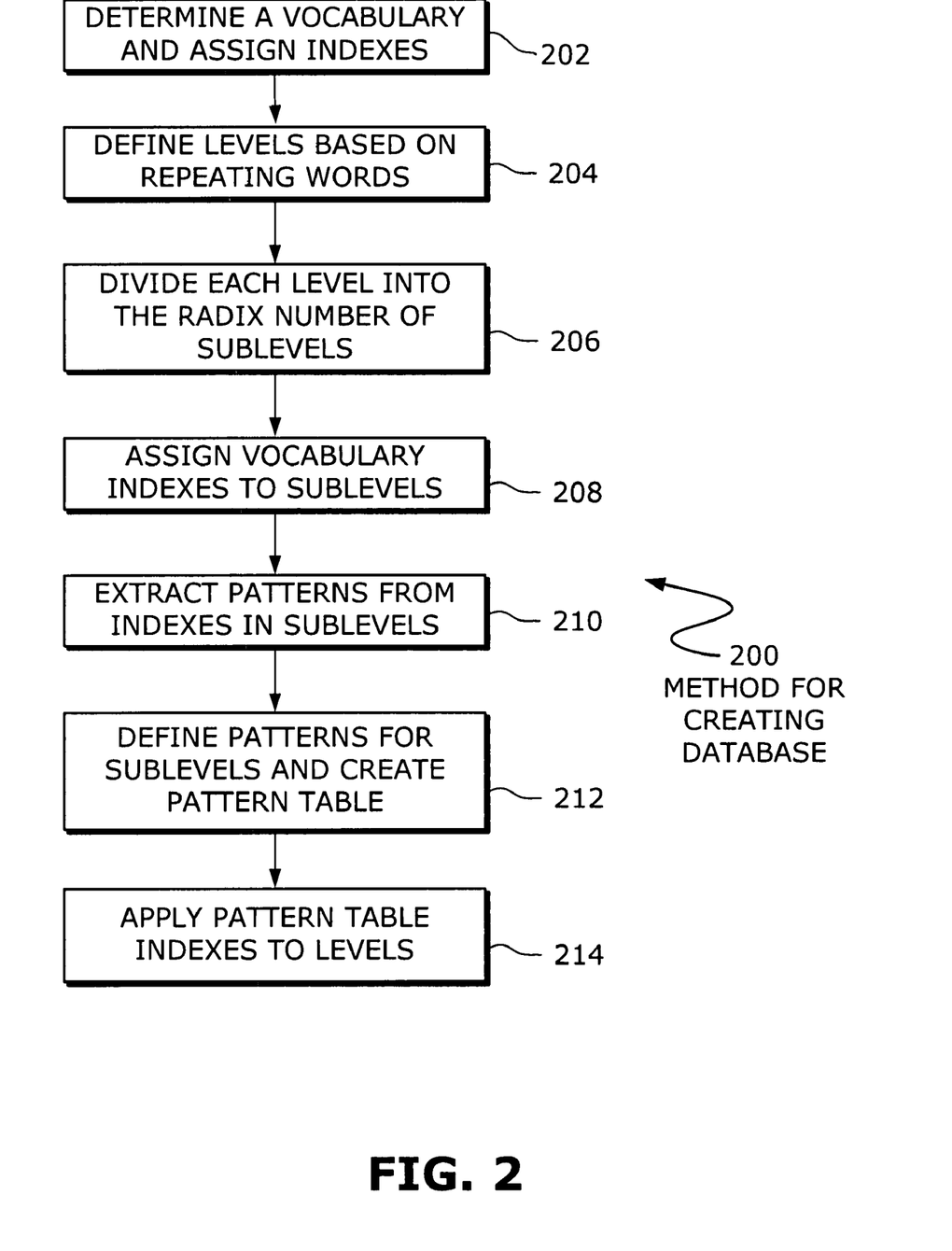
FIG. 2 is a flowchart illustration of an embodiment showing a method for creating a database.

FIG. 2 is a flowchart illustration of an embodiment 200 showing a method for creating a language representation database. A vocabulary is defined and indexed in block 202. The repeating characteristics of the language are used to define levels in block 204. Each level is divided into sublevels based on the radix in block 206. The vocabulary indexes are assigned to the sublevels in block 208, and patterns are extracted from the indexes in block 210. The patterns found within the sublevels are defined in block 212 and applied to the levels in block 214.

The embodiment 200 is a general method whereby the recurring patterns of a spoken or written representation of numbers can be captured and stored in a group of recurring patterns. In some cases, recurring patterns and their exceptions may be represented. The embodiment 200 may be applied to any language, however, English will be used in the following example.

In the following example, the patterns and representations for the English written language are developed for the numbers 1 to 99. Counting from 1 to 99 involves recurring patterns, such as "one", "two", and "three" that recurs in "twenty-one", "twenty-two", and "twenty-three" and so on. However, the pattern is different for the numbers from 11 to 19, where the representation is "eleven", "twelve", and "thirteen". Further, in some cases a hyphen ("-") may be placed after the word "twenty" in the combination "twenty-one" but not when the word "twenty" is used alone. These peculiarities will be illustrated in the following example.

In block 202, the vocabulary is established. For the example, the vocabulary may be represented as Table 1.

TABLE 1

Vocabulary and Index

| Word | Index |
| --- | --- |
| " " | 0 |
| "one" | 1 |
| "two" | 2 |
| "three" | 3 |
| "four" | 4 |
| "five" | 5 |
| "six" | 6 |
| "seven" | 7 |
| "eight" | 8 |
| "nine" | 9 |
| "ten" | 10 |
| "eleven" | 11 |
| "twelve" | 12 |
| "thirteen" | 13 |
| "fourteen" | 14 |
| "fifteen" | 15 |
| "sixteen" | 16 |
| "seventeen" | 17 |
| "eighteen" | 18 |
| "nineteen" | 19 |
| "-" | 20 |
| "twenty" | 21 |
| "thirty" | 22 |
| "forty" | 23 |
| "fifty" | 24 |
| "sixty" | 25 |
| "seventy" | 26 |
| "eighty" | 27 |
| "ninety" | 28 |
| "hundred" | 29 |
| "thousand" | 30 |

Table 1 contains the various text strings that will be used to represent the numbers between 1 and 999,999. Even though almost a million different text strings may be generated, only 30 actual text strings are defined in the database. In this example, the size of the text database is a small fraction of the total number of text strings which can be represented by the database.

Each text string has been assigned an index. In Table 1, each index number is sequentially assigned to sequential text strings. However, the index is merely a unique identifier and can be any randomly assigned number, most commonly an integer.

The words are spread out into levels based on the repeating words in block 204. Table 2 illustrates one embodiment using the current example.

TABLE 2

Defining Levels Based on Repeating Words

| | Level 3 | Level 2 | Level 1 |
|---|---|---|---|
| 0 | | | " " |
| 1 | | | "one" |
| 2 | | | "two" |
| ... | | | |
| 98 | "ninety" | — | "eight" |
| 99 | "ninety" | — | "nine" |

In Table 2, three levels are defined. Level 3 contains most of the tens representations. Level 2 contains a separator text string, in this case a hyphen, and Level 1 contains the ones representation. Level 1 also contains all of the representation of the numbers between 11 and 19. Level 3 contains the tens representations for twenty through ninety, but not for ten through nineteen.

Table 3 illustrates the contents of Table 2, grouped by the radix of 10.

TABLE 3

Grouping of Level 1 Words by Radix

| Sublevel | 0 | 10 | 20 Twenty | 30 Thirty | 40 Forty | 50 Fifty | 60 Sixty | ... |
|---|---|---|---|---|---|---|---|---|
| 0 | " " | "ten" | " " | " " | " " | " " | " " | |
| 1 | "one" | "eleven" | "one" | "one" | "one" | "one" | "one" | |
| 2 | "two" | "twelve" | "two" | "two" | "two" | "two" | "two" | |
| ... | | | | | | | | |
| 9 | "nine" | "nineteen" | "nine" | "nine" | "nine" | "nine" | "nine" | |

Replacing every word in Table 3 with the index from Table 1 yields Table 4.

TABLE 4

Grouping of Level 1 Indexes by Sublevels

| Sublevel | 0 | 10 | 20 Twenty | 30 Thirty | 40 Forty | 50 Fifty | 60 Sixty | ... |
|---|---|---|---|---|---|---|---|---|
| 0 | 0 | 10 | 0 | 0 | 0 | 0 | 0 | |
| 1 | 1 | 11 | 1 | 1 | 1 | 1 | 1 | |
| 2 | 2 | 12 | 2 | 2 | 2 | 2 | 2 | |
| ... | | | | | | | | |
| 9 | 9 | 19 | 9 | 9 | 9 | 9 | 9 | |

Table 4 illustrates the recurring patterns of the spoken numbers between one and 99. The indexes of Table 1 were selected so that the index of the string "ten" is index 10, "eleven" is index 11, and so on.

Table 4 can be further consolidated by defining a sublevel dictionary for each row, and defining indexes to the sublevel dictionary. This is shown in Table 5.

TABLE 5

Sublevel Dictionary Assignments

| Sublevel | Dictionary (vocabulary indexes) | 0 | 10 | 20 | 30 | 50 | 60 | ... |
|---|---|---|---|---|---|---|---|---|
| 0 | 0, 10 | 0 | 1 | 0 | 0 | 0 | 0 | |
| 1 | 1, 11 | 0 | 1 | 0 | 0 | 0 | 0 | |
| 2 | 2, 12 | 0 | 1 | 0 | 0 | 0 | 0 | |
| ... | | | | | | | | |
| 9 | 9, 19 | 0 | 1 | 0 | 0 | 0 | 0 | |

The second column of Table 5 is the sublevel dictionary, which point to the proper index within Table 1 for the vocabulary string. The remaining columns contain indexes into the sublevel dictionary, with the index 0 referring to the first item of the sublevel dictionary of column 2, and 1 referring to the second item.

For example, the 0 located in the "forty" column and "2" row refers to the first index of the sublevel dictionary, which is 2. Index 2 in the sublevel dictionary refers to the text string "two". Similarly, the 1 located in the "ten" column and "2" row refers to the second index of the sublevel dictionary, which is 12. Index 12 in the sublevel dictionary refers to the text string "twelve".

The rows of Table 5 may be defined by a recurring pattern. In every row of Table 5, the pattern is "0,1,0,0,0,0,0,0,0,0".

The number of entries in this pattern is equal to the radix. For a shorthand notation, the pattern "0,1,0,0,0,0,0,0,0,0" may be represented by "0,1,0*8", where "0*8" represents eight "0" entries in the series. Table 6 shows a table of patterns.

TABLE 6

Patterns

| Pattern | Pattern (short form) | Pattern Cycle | Index |
|---|---|---|---|
| 0, 1, 0, 0, 0, 0, 0, 0, 0, 0 | 0, 1, 0 * 8 | 10 (the pattern has 10 elements) | 0 |
| 0 | 0 | 1 | 1 |
| 0, 0, 1, 1, 1, 1, 1, 1, 1, 1 | 0 * 2, 1 * 8 | 10 | 2 |
| 0, 1, 1, 1, 1, 1, 1, 1, 1, 1 | 0, 1 * 9 | 10 | 3 |

Table 6 illustrates three patterns used in the representation of the numbers 1 to 99. Pattern index 0, or "0,1,0,0,0,0,0,0,0,0" is used to denote the pattern of the rows of Table 4. Pattern index 1, or "0,0,0,0,0,0,0,0,0,0" is used to denote a pattern when a word is used every time during the pattern cycle. Pattern index 2, or "0,0,1,1,1,1,1,1,1,1" is used to denote a pattern when a first index is used for the first two cycles, and the second index is used for the remaining cycles.

Table 7 illustrates the uses of the three patterns in the example.

TABLE 7

Consolidated Data

| Level | Word recurrence | Sublevel | Pattern (from table 6) | Pattern to vocabulary index with respect to pattern |
|---|---|---|---|---|
| 1 | 1 | 0 | 0 | 0, 10 |
|   |   | 1 | 0 | 1, 11 |
|   |   | 2 | 0 | 2, 12 |
|   |   | 3 | 0 | 3, 13 |
|   |   | 4 | 0 | 4, 14 |
|   |   | 5 | 0 | 5, 15 |
|   |   | 6 | 0 | 6, 16 |
|   |   | 7 | 0 | 7, 17 |
|   |   | 8 | 0 | 8, 18 |
|   |   | 9 | 0 | 9, 19 |
| 2 | 1 | 0 | 1 | 0 |
|   |   | 1 | 2 | 0, 20 |
|   |   | 2 | 2 | 0, 20 |
|   |   | 3 | 2 | 0, 20 |
|   |   | 4 | 2 | 0, 20 |
|   |   | 5 | 2 | 0, 20 |
|   |   | 6 | 2 | 0, 20 |
|   |   | 7 | 2 | 0, 20 |
|   |   | 8 | 2 | 0, 20 |
|   |   | 9 | 2 | 0, 20 |
| 3 | 10 | 0 | 1 | 0 |
|   |   | 1 | 1 | 0 |
|   |   | 2 | 1 | 21 |
|   |   | 3 | 1 | 22 |
|   |   | 4 | 1 | 23 |
|   |   | 5 | 1 | 24 |
|   |   | 6 | 1 | 25 |
|   |   | 7 | 1 | 26 |
|   |   | 8 | 1 | 27 |
|   |   | 9 | 1 | 28 |
| ... | ... | ... | ... | ... |
| ... | ... | ... | ... | ... |

Table 7 consolidates all the data for the three levels of the example. Level 1, in the first third of Table 7, represents the patterns needed to display the representation of the ones digit of a number. Level 2, in the middle third of Table 7, represents the patterns needed to display the hyphen between the tens and ones digits, if any. Level 3, in the bottom third of Table 7, represents the patterns needed to display the tens digit of any number between 1 and 99.

Table 7 is one embodiment of the recursive patterns that may be used to determine the spoken or written representation of a number between 1 and 99. Two layers of recursive patterns are used to define the sequence of counting in the spoken or written English language. Within each pattern may be one or more exceptions to the pattern, which may be defined by the alternative indexes such as in pattern index 0. The recognition and definition of such patterns allows the complex spoken or written representation of numbers to be consolidated into three tables, namely Table 1, the vocabulary, Table 6, the table of patterns, and Table 7, the consolidated data. In some embodiments, the data from Table 6 and Table 7 may be consolidated, so that the patterns of Table 6 are stored in the fourth column of Table 7.

Various layouts, notations, and indicia may be used by those skilled in the art to store the representations numbers in spoken or written languages. The examples and embodiments illustrated in this specification have been chosen to illustrate the concept of defining recurring patterns on several levels, with each level having a number of sublevel entries that is equal to the radix. Within this framework, patterns can be defined for specific languages and written or audio representations of numbers can be recreated.

Each level has a word recurrence value that denotes the number of recurring instances of the level, or the finest granularity to which the level applies. For example, Level 2 represents the hyphen or separator, which may vary with each number, i.e., there is a separator at "twenty-nine", no separator at "thirty", but a separator at "thirty-one". Thus, the Level 2 word recurrence is 1.

Similarly, the Level 3 word recurrence is 10. Level 3 represents the tens digit of a number, and every instance of "twenty", "thirty", and so on are used ten times in succession.

In the example of Table 7, the levels of the first column do not necessarily correspond with the digits of a number to be represented. Level 1 in the example does correspond with the ones digit, however Level 2 corresponds with the hyphen and Level 3 corresponds with the tens digit.

In the embodiment of Table 7, the various levels are selected so that the highest number level corresponds with the first portion of the spoken or written representation. As will be shown later, the construction of the spoken or written representation begins with the highest layer and works down. In other embodiments, the layers may be arranged so that the lowest layer is the first to be processed.

In the current example, the sequence of Layer 3, Layer 2, and Layer 1 follows the natural representation of a number. For example, the representation of the number 53 would be "fifty-three", with the "fifty" coming from the Layer 3 portion of Table 7, the hyphen "-" coming from the Layer 2 portion, and the "three" coming from the Layer 1 portion. If the current example were used to construct the representation of another language where the ones digit is spoken or written before the tens, Layer 3 may represent the ones digit and Layer 1 may represent the tens.

Because the representation framework of the embodiment is flexible, it may be used to represent the spoken or written representation of almost any language, regardless of the complexities of that language.

Figure 3:
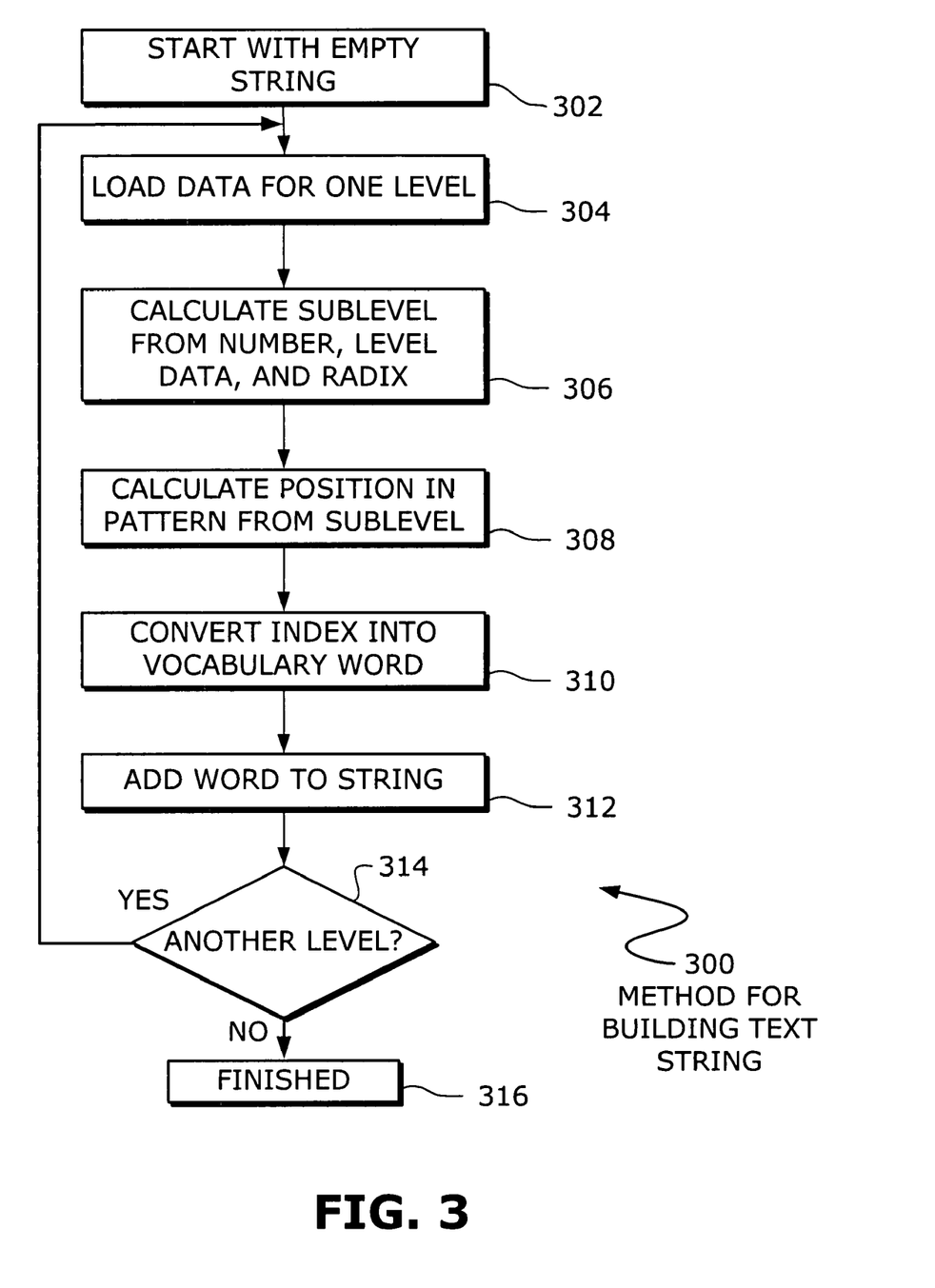
FIG. 3 is a flowchart illustration of an embodiment showing a method for building a text string.

FIG. 3 illustrates an embodiment 300 of a method for building a text string using the database constructed from the method of embodiment 200. The process starts with an empty string in block 302. The data is loaded for the first level is loaded in block 304. The sublevel is calculated from the number, level data, and radix in block 306. The position within the pattern of the sublevel is calculated in block 308, from which an index is used to find the vocabulary word in block 310, which is added to the text string in block 312. If another level exists in block 314, the process continues at block 304 with the new level. If another level does not exist in block 314, the process ends in block 316 with the completed text string.

The embodiment 300 illustrates the construction of a textual representation of a number in a specific language. The same process may be used to construct a sequence of audio files or clips that are played in sequence to represent the number. For the purposes of this specification, anywhere a vocabulary word or text string is discussed, it shall be assumed that an audio file, audio clip, or any other audio representation of the number shall be able to be substituted, unless specifically excepted.

The embodiment 300 is a method to calculate the proper vocabulary word from the database constructed in embodiment 200. For each level, beginning from the highest, a sublevel value is calculated using the formula:

$$Sublevel = \frac{Number \% (WordRecurrence * Radix)}{WordRecurrence} \quad \text{Equation 1}$$

where Number is the number to be represented and WordRecurrence is taken from Table 7, column 2 for the appropriate level. The % operator or modulus, returns an integer remainder after dividing the first operand by the second. The division operator returns the truncated integer portion of the division operation, with no rounding.

Once the sublevel is calculated, the position within the sublevel pattern may be determined using the formula:

$$PositionInPattern = \left(\frac{\left(\frac{Number}{WordRecurrence}\right)}{Radix}\right) \% PatternCycle \quad \text{Equation 2}$$

where PatternCycle is the number of recurring elements in the pattern. In general, the PatternCycle is usually, but not always, equal to the radix. As with the first equation, the % operator or modulus, returns an integer remainder after division and the division operator returns the integer portion of the division operation, with no rounding.

In a first example, the conversion of the number 45 to a text string will be shown.

The radix is 10, as this is the decimal system. In the example tables, the highest level is performed first, so Level 3 is selected. From Table 7 in the Level 3 section, the word recurrence value is 10. Using Equation 1, the sublevel is calculated as:

$$Sublevel = \frac{45\%(10*10)}{10} = 4$$

where 45% 100=45, and 45/10=4. Using Equation 2, the position in the pattern is:

$$PositionInPattern = \left(\frac{\left(\frac{45}{10}\right)}{10}\right) \% 1 = 0$$

where 45/10=4, 4/10=0, and 0% 1=0. From column 4 of Table 7 in the Level 3 section, the pattern is index 1. From Table 6, the pattern is "0,0,0,0,0,0,0,0,0,0" and the vocabulary word is index 23. From Table 1, the first vocabulary word is "forty".

Moving to Level 2 and examining Table 7 in the Level 2 section, the word recurrence value is 1. Using Equation 1 and number as 45, the sublevel is calculated as:

$$Sublevel = \frac{45\%(1*10)}{1} = 5$$

where 45% 10=5 and 5/1=5. Using Equation 2, the position in the pattern is:

$$PositionInPattern = \left(\frac{\left(\frac{45}{1}\right)}{10}\right) \% 10 = 4$$

where 45/10=4 and 4% 10=4. From Table 6, the pattern is "0,0,1,1,1,1,1,1,1,1" and the vocabulary indexes, from column 5 of Table 7, are 0, 20. At the fourth position of the pattern is index 1, which means that the second vocabulary index is required, in this case it is vocabulary index 20, or "-", the hyphen. The hyphen is appended to the previous string, and the string becomes "forty-".

Moving to Level 1 and examining Table 7 in the Level 1 section, the word recurrence value is 1. Again using Equation 1 and the number 45, the sublevel is calculated as:

$$Sublevel = \frac{45\%(1*10)}{1} = 5$$

where 45% 10=5 and 5/1=5. Using Equation 2, the position in the pattern is:

$$PositionInPattern = \left(\frac{\left(\frac{45}{1}\right)}{10}\right) \% 10 = 4$$

where 45/10=4 and 4% 10=4. From Table 6, the pattern is "0,1,0,0,0,0,0,0,0,0". The vocabulary indexes, from column 5 of Table 7 sublevel 5, are 5 and 15. The pattern indicates a "0" at the fourth position, indicating that the first vocabulary index should be used. Vocabulary index 5, from Table 1, is the string "five", which is added to the previous string to yield "forty-five".

In a second example, the number 19 will be converted into a text string.

The radix is 10, since it is a decimal representation. As in the previous example, Level 3 is selected first. From Table 7 in the Level 3 section, the word recurrence value is 10. Using Equation 1, the sublevel is calculated as:

$$Sublevel = \frac{19\%(10*10)}{10} = 1$$

where 19% 100=19, and 19/10=1. Using Equation 2, the position in the pattern is:

$$PositionInPattern = \left(\frac{\left(\frac{19}{10}\right)}{10}\right) \% 1 = 0$$

where 19/10=1, 1/10=0, and 0% 1=0. From column 4 of Table 7 in the Level 3 section, the pattern is index 1, with a vocabulary index of 0. From Table 6, the pattern is "0,0,0,0,0,0,0,0,0,0". From Table 1, the first vocabulary word is "" or the empty string.

Moving to Level 2 and examining Table 7 in the Level 2 section, the word recurrence value is 1. Using Equation 1 and number as 19, the sublevel is calculated as:

$$Sublevel = \frac{19\%(1*10)}{10} = 9$$

where 19% 10=9 and 9/1=9. Using Equation 2, the position in the pattern is:

$$PositionInPattern = \left(\frac{\left(\frac{19}{1}\right)}{10}\right) \% 10 = 1$$

where 19/10=1 and 1% 10=1. From Table 6, the pattern is "0,0,1,1,1,1,1,1,1,1" and the vocabulary indexes, from column 5 of Table 7, are 0. At the second position of the pattern is index 0, which means that the first vocabulary index is required, in this case it is vocabulary index 0, or " ", the empty string. The null string is appended to the previous string, and the string remains the empty string.

Moving to Level 1 and examining Table 7 in the Level 1 section, the word recurrence value is 1. Again using Equation 1 and the number 19, the sublevel is calculated as:

$$Sublevel = \frac{19\%(1*10)}{1} = 9$$

where 19% 10=9 and 9/1=9, same as the previous level. Using Equation 2, the position in the pattern is:

$$PositionInPattern = \left(\frac{\left(\frac{19}{1}\right)}{10}\right) \% 10 = 1$$

where 19/10=1 and 1% 10=1, same as the previous level. From Table 6, the pattern is "0,1,0,0,0,0,0,0,0". The vocabulary indexes, from column 5 of Table 7 sublevel 9, are 9 and 19. The pattern indicates a "1" at the second position (using a zero-based indexing system), indicating that the second vocabulary index should be used. Vocabulary index 5, from Table 1, is the string "nineteen", which is added to the previous empty string to yield "nineteen".

The two previous examples illustrate how the database, as constructed by the method of embodiment 200, may be used to generate a specific sequence of text strings that represent numbers. Databases may be constructed for many different languages or representations of numbers, such as Italian, Spanish, Arabic, Hebrew, Japanese, Chinese, Roman Numerals, or any other representation of a number that may be constructed from a sequenced vocabulary. Additional databases may be generated for the conversion of decimal with numbering systems with other radixes. For example, a database may be used to convert strings like "0x000A" in hexadecimal, "10" in a text string, "00001010" in binary, or "X" in Roman numerals to or from the decimal number 10. Further, the database embodied in the various Tables may be expanded to include hundreds, thousands, millions, etc.

Many different variations of the database construction may be used. For example, in some databases, the hyphen separator may be handled by creating vocabulary words that incorporatse the hyphen in the text string. By making the patterns and tables accordingly, the hyphen separator of Level 2 of the above example may be removed. When the various databases use consistent syntax, the method of embodiment 300 will construct the representation of any number.

Figure 4:
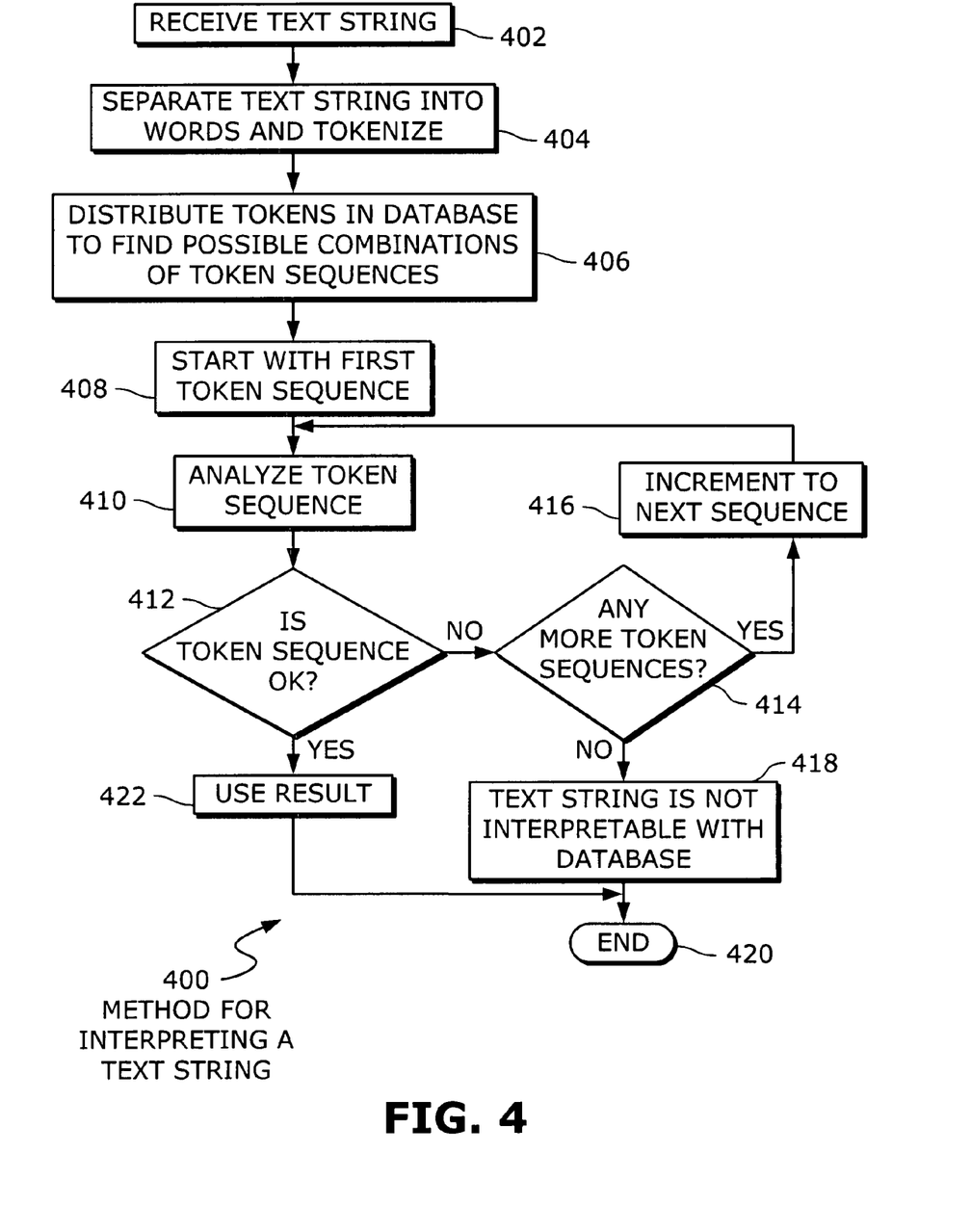
FIG. 4 is a flowchart illustration of an embodiment showing a method for interpreting a text string.

FIG. 4 is a flowchart illustration of embodiment 400 showing a method for interpreting a text string. The text string is received in block 402 and separated into words which are then tokenized in block 404. The tokens are distributed into the database to find possible combinations of token sequences in block 406.

Beginning with the first token sequence in block 408, the token sequence is analyzed in block 410. If the token sequence is not OK in block 412, and other token sequences are available in block 414, the next token sequence is incremented in block 416 and analyzed in block 410. If all token sequences have been analyzed in block 414, the text string is not interpretable with the database in block 418. If the token sequence is OK in block 412, the result is used in block 422 and the process ends in block 420.

Embodiment 400 is one method by which a text string may be analyzed using the database constructed in embodiment 200 above. A text string is divided into words that correspond with a dictionary portion of the database. In many languages, a space or separator may be interpreted as a 'word' for these purposes. The text strings may be tokenized by correlating the text string for each 'word' with the dictionary entry.

The text string "one hundred five" may be tokenized and combined into several token sequences, as illustrated in the following table for a database for the English language terms from 0 to 999,999.

TABLE 8

| Level (sample) | 9 (nine) | 8 (hundred) | 7 (ninety) | 6 (nine) | 5 (thousand) | 4 (nine) | 3 (hundred) | 2 (ninety) | 1 (nine) |
|---|---|---|---|---|---|---|---|---|---|
| Seq 1 | One | | | | | | hundred | | five |
| Seq 2 | One | hundred | | | | | | | five |
| Seq 3 | One | hundred | | five | | | | | |
| Seq 4 | One | hundred | | | | five | | | |
| Seq 5 | | | | | One | | hundred | | five |
| Seq 6 | | | | | | | One | hundred | five |

Each column in Table 8 represents a possible location for the words in the text string "one hundred five". When analyzing each word individually, the word "one" may be present in level 9, in the one hundred thousand column, level 6, in the one thousand column, in level 4, the one hundred column, and in level 1, the ones column. Similarly, the words "hundred" and "five" may be distributed into different columns as well, yielding several combinations. Each possible sequence illustrated in Table 8 uses all of the words in the original text string and in the sequence of the original text string.

Using the dictionary of Table 1, each sequence may be translated into a token sequence using numbers. For example, Sequence 1 in Table 8 may be represented by the sequence [1, 0, 0, 0, 0, 0, 29, 5]. Similarly, Sequence 6 may be represented by the sequence [0, 0, 0, 0, 0, 0, 1, 29, 5]. For the analysis below, each sequence has a "word" that corresponds to a level in Table 8. The index 0 in Table 1 referrs to the blank word or space, which is considered a "word" for these purposes.

Each of the sequences within Table 8 of this example will be analyzed to determine if the sequence is a legitimate combination. A proper text sequence will have one intersection or legitimate combination to represent a number.

In embodiment 400, all possible combinations of token sequences are created in block 406 and each are separately analyzed in the following blocks. In other embodiments, a token sequence may be created and then analyzed before creating a second token sequence.

Figure 5:
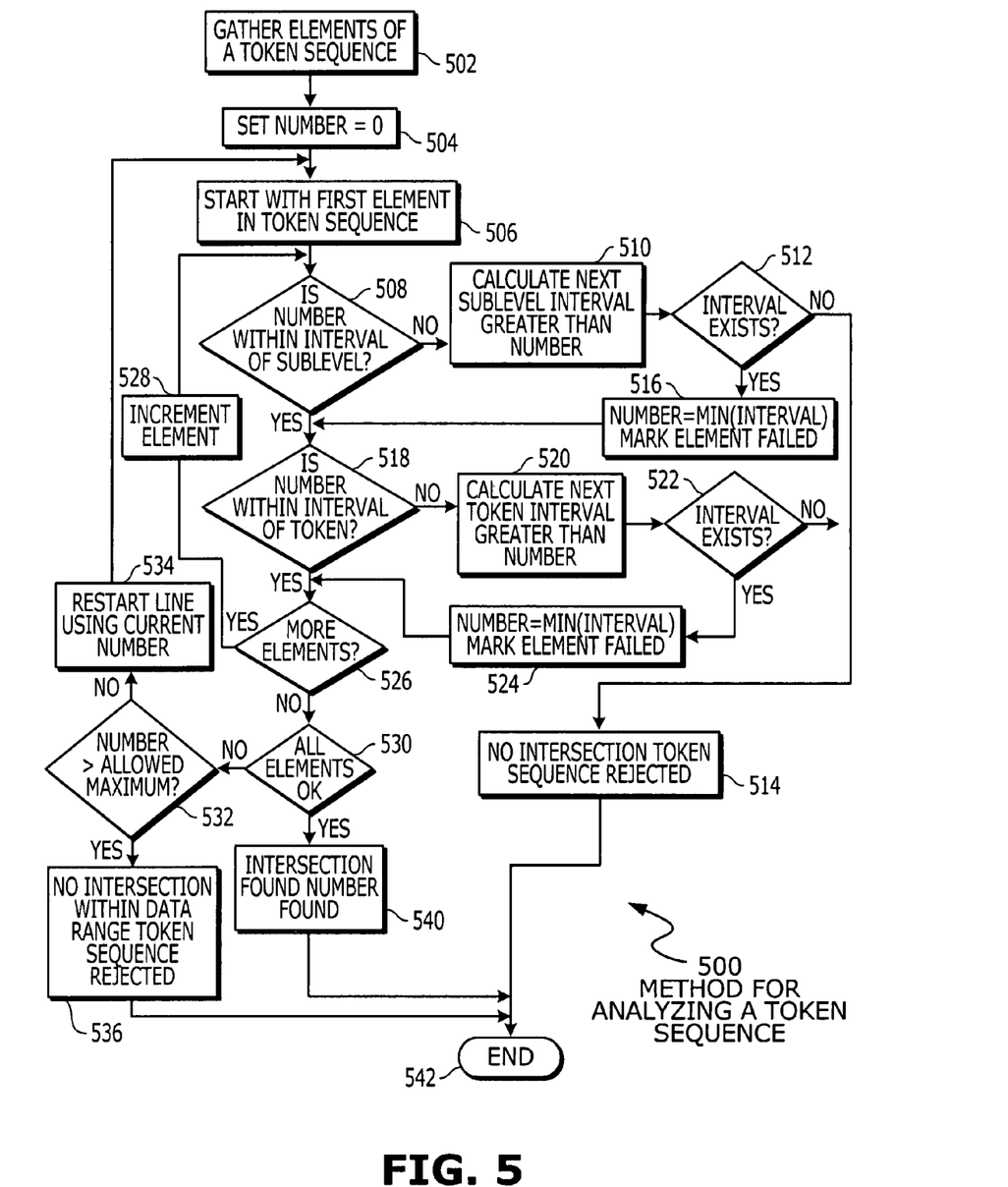
FIG. 5 is a flowchart illustration of an embodiment showing a method for analyzing a token sequence.

FIG. 5 is a flowchart illustration of an embodiment 500 showing a method for analyzing a token sequence. The elements of a token sequence are gathered in block 502. The number to be determined from the sequence is set to zero in block 504.

Starting with the first element in the token sequence in block 506, if the current number is not within the interval of the sublevel in block 508, the next sublevel interval greater than the number is calculated in block 510. If the interval does not exist in block 512, no intersection is found and the token sequence is rejected in block 514. If the interval exists in block 512, the number is calculated to be the minimum number in the interval and the element is marked as failed in block 516.

If the number is within the interval of the sublevel in block 508 but the number is not within the interval of the token in block 518, the next token interval greater than the number is calculated in block 520. If the interval does not exist in block 522, no interval is found and the token sequence is rejected in block 514. If the interval does exist in block 522, the number is calculated to be the minimum number in the interval and the element is marked as failed in block 524.

If more elements exist in block 526, the element is incremented in block 528 and the process continues in block 508 with the same number.

If no more elements exist in block 526 and one or more elements have been marked as failed in block 530, and the calculated number is less than the maximum number for the database in block 532, the analysis is restarted in block 506 with the current number, but the analysis beginning with the first element in block 506. If the calculated number is greater than the maximum number for the database in block 532, no intersection is found within the data range and the token sequence is rejected in block 536.

If all the elements are OK in block 530, the intersection is found and the calculated number is used in block 540. The process ends in block 542.

Embodiment 500 is one method by which a token sequence may be analyzed to determine if the token sequence is the proper intersection and calculate the number representing the text string. As the sequence of tokens is analyzed, the number represented by the sequence is calculated by finding the next higher number that would fulfill the conditions of each level. As each token satisfies the conditions of each level, the calculated number grows. Each time the number is advanced, an element or flag is marked as failed in blocks 516 and 524. If one or more of the elements causes the number to be advanced, block 530 causes the process to be repeated until all of the tokens are analyzed against a calculated number without requiring the number to be changed. In some complex cases, several passes may be required to converge on a calculated number.

In order to determine if a number is within the interval of a sublevel as in block 508, the sublevel of the number is calculated and compared to the sublevel of the line element being analyzed. The sublevel may be calculated using Equation 1 from above:

$$\text{Sublevel} = \frac{\text{Number \%}(WordRecurrence * \text{Radix})}{WordRecurrance} \quad \text{Equation 1}$$

where Number is the number to be represented and WordRecurrence is taken from Table 7, column 2 for the appropriate level. The % operator or modulus, returns an integer remainder after dividing the first operand by the second. The division operator returns the truncated integer portion of the division operation, with no rounding.

If the calculated sublevel is not the same as the sublevel of the current element, the next sublevel interval greater than the number is calculated in block 510. This process may be performed in the following manner.

$$\text{BaseNumber} = \text{Number/Word Recurrence/Radix} \quad \text{Equation 3}$$

As above, the division operator returns the truncated integer portion of the division operation, with no rounding.

If the number's sublevel is greater than the line's sublevel, the next sublevel adds one cycle:

$$\text{NextSublevel} = \text{LineSublevel} + \text{Radix} \quad \text{Equation 4}$$

Equation 4 may be repeated until the number's sublevel is equal to the line's sublevel and $$\text{NextSublevel} = \text{LineSublevel} \quad \text{Equation 5}$$

In order to calculate the next higher number if the current number is not within the sublevel, as in block 516, the following equation may be used:

$$\text{NextNumber} = (\text{BaseNumber} * \text{Radix} + \text{NextSublevel}) * \text{Word Recurrence} \quad \text{Equation 4}$$

The position of the number within a pattern can be calculated with the Equation 2 from above:

$$\text{PositionInPattern} = \left( \frac{\left( \frac{\text{Number}}{WordRecurrance} \right)}{\text{Radix}} \right) \% \text{PatternCycle} \quad \text{Equation 2}$$

where PatternCycle is the number of recurring elements in the pattern. In general, the PatternCycle is usually, but not always, equal to the radix. As with the first equation, the % operator or modulus, returns an integer remainder after division and the division operator returns the integer portion of the division operation, with no rounding.

If the word on the calculated position is not the same as the word in the line element as in block 518, the next greater number is calculated in block 520.

If the word appears in the pattern after the position of the number, then $$\text{NextWordPosition} = \text{WordPosition} \quad \text{Equation 5}$$

otherwise the cycle of the pattern is added:

$$\text{NextWordPosition} = \text{WordPosition} + \text{PatternCycle} \quad \text{Equation 6}$$

The next number is calculated using the formula:

$$\text{NextNumber} = ((\text{BaseNumber} + \text{Next WordPosition}) * \text{Radix} + \text{Sublevel}) * \text{Word Recurrence} \quad \text{Equation 7}$$

An example will be shown from Sequences 1 and 6 from Table 8, reproduced below:

TABLE 8

Word Sequence Combinations

| Level (sample) | 9 (nine) | 8 (hundred) | 7 (ninety) | 6 (nine) | 5 (thousand) | 4 (nine) | 3 (hundred) | 2 (ninety) | 1 (nine) |
|---|---|---|---|---|---|---|---|---|---|
| Seq 1 | One |  |  |  |  |  | hundred |  | five |
| Seq 2 | One | hundred |  |  |  |  |  |  | five |
| Seq 3 | One | hundred |  | five |  |  |  |  |  |
| Seq 4 | One | hundred |  |  |  | five |  |  |  |
| Seq 5 |  |  |  | One |  |  | hundred |  | five |
| Seq 6 |  |  |  |  |  | One | hundred |  | five |

Sequence 1 has a tokenized line sequence of [1, 0, 0, 0, 0, 0, 29, 0, 5] and similarly, Sequence 6 may be defined as [0, 0, 0, 0, 0, 0, 1, 29, 5].

The following Table 9 is an extended portion of Table 7, showing Levels 8 and 9:

TABLE 9

Consolidated Data

| Level | Word recurrence | Sublevel | Pattern (from table 6) | Pattern to vocabulary index with respect to pattern |
|---|---|---|---|---|
| ... | ... | ... | ... | ... |
| ... | ... | ... | ... | ... |
| 8 | 100,000 | 0 | 1 | 0 |
|  |  | 1 | 3 | 0, 29 |
|  |  | 2 | 3 | 0, 29 |
|  |  | 3 | 3 | 0, 29 |
|  |  | 4 | 3 | 0, 29 |
|  |  | 5 | 3 | 0, 29 |
|  |  | 6 | 3 | 0, 29 |
|  |  | 7 | 3 | 0, 29 |
|  |  | 8 | 3 | 0, 29 |
|  |  | 9 | 3 | 0, 29 |
| 9 | 100,000 | 0 | 1 | 0 |
|  |  | 1 | 1 | 1 |
|  |  | 2 | 1 | 2 |
|  |  | 3 | 1 | 3 |
|  |  | 4 | 1 | 4 |
|  |  | 5 | 1 | 5 |
|  |  | 6 | 1 | 6 |
|  |  | 7 | 1 | 7 |
|  |  | 8 | 1 | 8 |
|  |  | 9 | 1 | 9 |

Analyzing Sequence 1, the calculated number starts as 0. Beginning with the first token, which is '1' in Level 9 from Table 8, the number 0 is within the sublevel.

Calculating the sublevel for the number 0 and Level 9 from Table 9, $$Sublevel = \frac{0 \% (100,000 * 10)}{100,000} = 0$$

The number 0 is within the interval of the sublevel.

Calculating whether the number is within the interval of the token, as in block 518, the position of the number 0 is:

$$PositionInPattern = \left(\frac{\left(\frac{0}{1}\right)}{10}\right) \% 1 = 0$$

However, the calculated position of the token "1" is:

$$PositionInPattern = \left(\frac{\left(\frac{1}{1}\right)}{10}\right) \% 1 = 1$$

Because the position of the number and the position of the token are not equal, the NextWordPosition is calculated to be the WordPosition for "1", which is 1.

The next number is calculated using Equation 7:

NextNumber=((0+1)*10+1)*100,000=100,000

When analyzing the next token, or "0" in Level 8, the number is now 100,000. After performing the same calculations for the token "0" in Level 8, the calculated number becomes 1,000,000. Completing the calculations for all of the tokens in the sequence, the first pass through the sequence would result in a number of 1,000,005. When a second pass through the tokens but starting with the number 1,000,005, the calculations will either increase the number until the number is outside the bounds of the dataset or one of the interval calculations in blocks 512 or 522 will cause the process to fail and reject the token sequence.

For the number 100,000, the second token should be 29 for the word "hundred". Because Sequence 1 has a blank as a second token, the method 500 will calculate ever higher numbers until a failure point is reached.

When Sequence 6 is analyzed using the method 500, the calculated number in the first pass is 105. The analysis is performed starting with the number 105 as a second pass and no further changes are made to the number, yielding the correct result of 105.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
creating a database by a first method comprising:
determining a first vocabulary for numbers to be represented, said first vocabulary being from a first language and comprising vocabulary words;
assigning a vocabulary index for each of said first vocabulary words;
creating a two dimensional table comprising levels and said first vocabulary words assigned to said levels, each of said levels being one of a sequence of said first vocabulary words representing said numbers;
grouping said two dimensional table by a radix to create groups of said levels, each of said groups of said levels being arranged by sublevels representing incremental numbers within each of said groups; and
representing said two dimensional table using a set of patterns and said vocabulary indexes, each of said sublevels being defined with one of said patterns and at least one vocabulary index representing one of said vocabulary words applied by said one of said patterns;
performing a second method on a computer processor, said second method comprising:
receiving a text string representing a number in said first language;
separating said text string into words;
determining at least one distribution of said words within said database;
analyzing each of said at least one distribution of said words to find an intersection; and
determining said number based on said intersection.

2. The method of claim 1, said distribution comprising a sequence of said words for each of said levels.

3. The method of claim 2, said analyzing comprising:
recursively analyzing each of said words;
calculating a number based on said words;
determining if said number is consistent with said database and said words.

4. The method of claim 3, said recursively analyzing comprising analyzing one level at a time.

5. The method of claim 1 wherein said radix is 10.

6. The method of claim 1 wherein said first vocabulary comprises English language words.

7. The method of claim 1, said text string being created by translating an audio stream into said text string.

8. A method performed on a computer processor, said method comprising:
receiving a text string representing a number;
referencing a database comprising:
a first vocabulary for numbers to be represented, said first vocabulary being from a first language and comprising vocabulary words, each of said vocabulary words having a vocabulary index;
a representation of a two dimensional table using a set of patterns and said vocabulary indexes, said two dimensional table comprising levels and said first vocabulary words assigned to said levels, each of said levels being one of a sequence of said first vocabulary words representing said numbers, said two dimensional table being grouped by a first radix to create groups of said levels, each of said groups of said levels being arranged by sublevels representing incremental numbers within each of said groups, each of said sublevels being defined with one of said patterns and at least one vocabulary index representing one of said vocabulary words applied by said one of said pattern; and
performing a second method on a computer processor, said second method comprising:
separating said text string into words;
determining at least one distribution of said words within said database;
analyzing each of said at least one distribution of said words to find an intersection; and
determining said number based on said intersection.

9. The method of claim 8, said distribution comprising a sequence of said words for each of said levels.

10. The method of claim 9, said analyzing comprising:
recursively analyzing each of said words;
calculating a number based on said words;
determining if said number is consistent with said database and said words.

11. The method of claim 10, said recursively analyzing comprising analyzing one level at a time.

12. The method of claim 8 wherein said radix is 10.

13. The method of claim 8 wherein said first vocabulary comprises English language words.

14. A computer readable storage medium comprising computer executable instructions adapted to perform the method of claim 8.

15. A system comprising:
a database comprising:
a first vocabulary for numbers to be represented, said first vocabulary being from a first language and comprising vocabulary words, each of said vocabulary words having a vocabulary index;
a representation of a two dimensional table using a set of patterns and said vocabulary indexes, said two dimensional table comprising levels and said first vocabulary words assigned to said levels, each of said levels being one of a sequence of said first vocabulary words representing said numbers, said two dimensional table being grouped by a first radix to create groups of said levels, each of said groups of said levels being arranged by sublevels representing incremental numbers within each of said groups, each of said sublevels being defined with one of said patterns and at least one vocabulary index representing one of said vocabulary words applied by said one of said pattern; and
a device adapted to perform a method comprising:
receiving a text string representing a number in said first language;
separating said text string into words;
determining at least one distribution of said words within said database;
analyzing each of said at least one distribution of said words to find an intersection; and
determining said number based on said intersection.

16. The system of claim 15, said distribution comprising a sequence of said words for each of said levels.

17. The system of claim 16, said analyzing comprising:
recursively analyzing each of said words;
calculating a number based on said words;
determining if said number is consistent with said database and said words.

18. The system method of claim 17, said recursively analyzing comprising analyzing one level at a time.

19. The system of claim 15 wherein said radix is 10.

20. The system of claim 15 wherein said first vocabulary comprises English language words.

21. The method of claim 1, said calculate a sublevel being performed using a formula comprising:

sublevel=((said number)*modulus (said word recurrence value*said radix)))/(said word recurrence value).

* * * * *